A. BLAUVELT.
WATER METER.
APPLICATION FILED OCT. 4, 1911.

1,122,467.

Patented Dec. 29, 1914.
2 SHEETS—SHEET 2.

Witnesses:
Robert N. Weir
A. H. Rabag

Inventor
Albert Blauvelt
by Rector, Hibben Davis & Macauley
Attys.

UNITED STATES PATENT OFFICE.

ALBERT BLAUVELT, OF CHICAGO, ILLINOIS.

WATER-METER.

1,122,467.   Specification of Letters Patent.   Patented Dec. 29, 1914.

Application filed October 4, 1911.   Serial No. 652,767.

*To all whom it may concern:*

Be it known that I, ALBERT BLAUVELT, a citizen of the United States, residing at Chicago, Cook county, Illinois, have invented certain new and useful Improvements in Water-Meters, of which the following is a specification.

My invention relates more particularly to meters such as are employed in the city or town water mains where unusual demands may be made upon the system at certain times, as for example in case of fire. When such emergencies arise it is of little or no importance that the flow of water be measured but on the other hand it is of the utmost importance that the flow of water be restricted as little as possible. To the normal flow of water a meter presents comparatively little obstruction but it provides a more serious resistance to an unusual flow of water and especially is this the case owing to the fact that the increased flow stirs up and carries along more or less foreign matter such as floating hemp, dead leaves, etc., which normally lies at rest along the bottom of the conduit or main but which when borne along by the unusual flow is trapped within and clogs the meter still further diminishing the flow of water. Of course it is possible to protect the meter by a strainer and this is sometimes done, but in that event the strainer itself becomes clogged and acts as an obstruction to the desirable free flow of water.

It is the object of my invention to obviate this disadvantage in the employment of meters in the public or other large mains and with this purpose I have devised a meter which is so mounted in the conduit that it normally receives the full flow in the conduit and meters the same as it passes therethrough; but in the event of an extraordinary pressure due to an emergency use of the pipes or in the event of the meter becoming clogged it automatically retreats from its position in the conduit and thereby permits the free passage of water.

My invention is shown in a preferred embodiment in the accompanying drawings forming a part of this application but it will be understood that it is not limited to this specific form which is illustrated and described for the purpose of enabling the invention to be more readily and completely understood, but the invention itself is of broader scope and may be embodied in a great variety of apparatus as will be obvious from the following description and claims which latter determine the scope of the invention.

Figure 1:
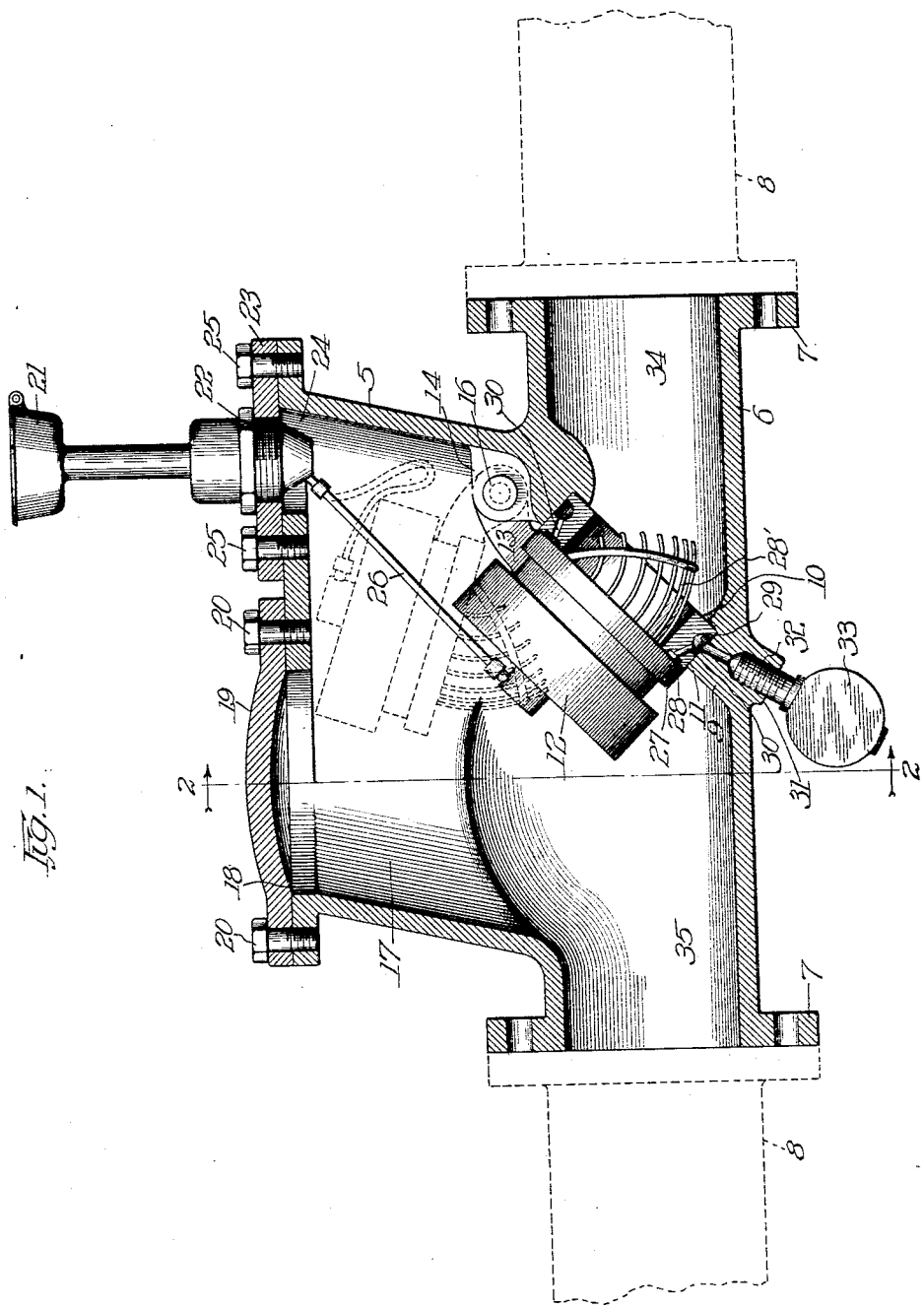
Figure 2:
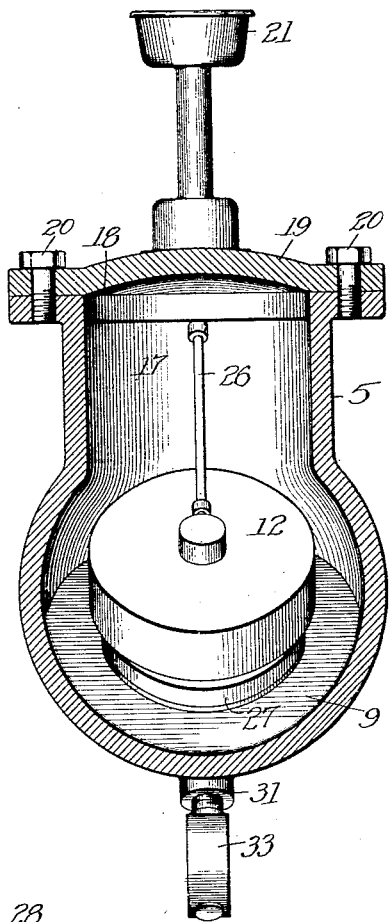
Figure 3:
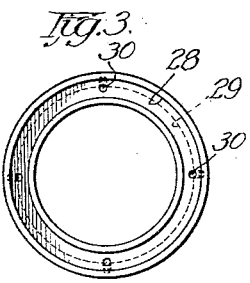
Figure 4:
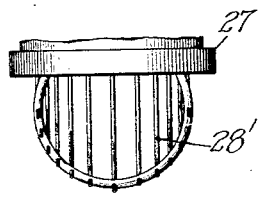

In the drawings Figure 1 represents in central vertical section a casing adapted to be interposed in the line of the conduit and containing my invention the adjacent conduit sections being shown in dotted lines; Fig. 2 is a cross section upon the line 2—2 of Fig. 1; Figs. 3 and 4 are details to be explained later.

Referring more especially to Figs. 1 and 2 the casting 5 embodies a conduit section 6 having flanges 7 for attachment to the neighboring sections of conduit 8—8 shown in dotted lines. At a suitable point in the length of the conduit is formed an inclined seat 9 which is rabbeted as at 10 for the reception of a ring seat 11 upon which is normally seated the meter 12. The latter may be of any usual or approved construction and is shown only diagrammatically since its specific construction forms no part of my invention. It is, however, provided with perforated lugs 13 by which it is hinged to the lugs 14 cast within the casing, a pin 16 forming the pivot of the joint. The casting 5 also forms an upwardly extending chamber 17 into which the pivoted meter retreats when it is swung upward from its seat. A hand hole 18 provided with a cover 19 gives access to the interior of the casing and the cover is secured in place by bolts 20. Upon the casing is also mounted a dial mechanism (not shown) inclosed within a housing 21 which is screw threaded at its lower end as at 22 and secured within a tapped opening in a plate 23 covering an opening 24 in the casing. Screws 25 secure the plate in position. A flexible shaft 26 connects the meter with the indicator or dial and not only the meter but also the shaft and indicator mechanism are shown conventionally since their specific construction is obvious to those skilled in the art and forms no part of the present invention. On its under-face the meter is preferably formed with a ground seating ring 27 which matches with a correspondingly ground face upon the ring seat 11 and a strainer or refuse catcher 28' is also secured to the lower face of the meter to prevent leaves or other refuse from passing through the conduit when the meter leaves its seat to the detriment or damage of the nozzles or other apparatus that may be used beyond the meter.

In Fig. 1 the meter is shown in dotted lines in its raised position and it will be apparent that by cutting off the water, access may be obtained to the meter for cleaning or other purposes through the hand hole 18. Within the seating face of the ring seat 11 is formed an annular shallow groove 28, see Figs. 1 and 3, and surrounding the periphery of the ring seat is a groove 29 the two grooves being connected by intermediate passages 30 formed at suitable intervals. Within a boss 31 on the casting is a tapped bore 32 which receives the coupling of a small meter 33 and communicates with the circumferential groove of the seat ring. The small meter 33 may be open to the atmosphere or connected to any drain which will receive the water flowing therethrough. Under normal conditions the water on the influx side 34 of the casting and the efflux side 35 is under substantially the same pressure or at least the pressure difference is so slight as to be immaterial. Any water which penetrates to the groove 28 within the seat ring may immediately flow off or at least lose its pressure by reason of the ready outlet through the meter 33. It follows that there is a differential pressure upon the main meter by reason of the greater area exposed to the pressure of the water on the efflux side as compared with that exposed to pressure upon the influx side and the difference in pressure is sufficient to hold the meter firmly to its seat under all except abnormal conditions. When, however, water is drawn in large quantities from the system at a point beyond the meter as for example in the case of fire or if the meter becomes so clogged as to not permit the ready flow of water therethrough, the pressure upon the efflux side becomes diminished to such a point as compared to that on the influx side that the meter is raised from its seat and held within the upper chamber portion of the casting by the flow of water. The passage of water through the seat 9 is then practically unobstructed though of course it is not measured by the meter; and furthermore the water then has free access to the groove in the seating ring whence it flows to the small meter and is measured. In this manner a comparatively accurate record is made of the time that the main meter is away from its seat. This escape is further of advantage in case the lifting of the meter is due to accumulation of debris and clogging for it gives a warning thereof, it being understood that the small meter is so located in actual practice as to be readily observed.

It will be obvious that by my invention no branch pipe and but little modification of the ordinary water main is required, the apparatus is not bulky and yet it meters the water under normal conditions effectively while presenting no obstruction to abnormal flow, and relieving automatically a clogged condition of the meter.

I claim:

1. In a water system, a conduit, a seat encircling the water passage thereof, a water meter normally engaging the seat arranged to receive the flow of water in the conduit, provided with the trash catcher 28 and adapted to be forced away from its seat by excess differential pressure upon the inlet side of the meter, and means whereby the meter is movably mounted in the conduit.

2. In a water system, a main, a seat encircling the main, a meter hinged to the main normally engaging the seat, and arranged to receive the flow of water in the main, an indicator mounted upon the main and a flexible shaft connecting the indicator and the meter.

3. In a water system, a conduit section having an annular seat encircling its water passage, there being a groove formed in the face of the seat, and passages leading from the groove to the exterior of the section, a water meter engaging the seat and arranged to receive the flow of water in the conduit but mounted to retreat from the seat under excess differential inlet pressure, and an indicator connected to the meter.

ALBERT BLAUVELT.

Witnesses:
CHRIST NISSEN,
Mrs. C. M. BROWN.

Copies of this patent may be obtained for five cents each, by addressing the "Commissioner of Patents Washington, D. C."